United States Patent
Wilson et al.

(10) Patent No.: US 6,915,402 B2
(45) Date of Patent: Jul. 5, 2005

(54) METHOD AND SYSTEM FOR CREATING SECURE ADDRESS SPACE USING HARDWARE MEMORY ROUTER

(75) Inventors: Kenneth Mark Wilson, San Jose, CA (US); Paul Keltcher, Sunnyvale, CA (US); Yoshio Turner, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 250 days.

(21) Appl. No.: 09/864,527

(22) Filed: May 23, 2001

(65) Prior Publication Data

US 2002/0178337 A1 Nov. 28, 2002

(51) Int. Cl.[7] .............................................. G06F 12/10
(52) U.S. Cl. ...................... 711/173; 711/170; 711/171; 711/172; 711/147; 711/148; 709/212; 709/213; 709/214; 709/215; 709/216
(58) Field of Search ................................ 709/212–216; 711/147, 148, 170–173, 202–206

(56) References Cited

U.S. PATENT DOCUMENTS

| | | | | |
|---|---|---|---|---|
| 5,237,673 A | * | 8/1993 | Orbits et al. ................. | 711/170 |
| 6,247,109 B1 | * | 6/2001 | Kleinsorge et al. ........... | 712/13 |
| 6,332,180 B1 | * | 12/2001 | Kauffman et al. .......... | 711/153 |
| 6,381,682 B2 | * | 4/2002 | Noel et al. .................. | 711/153 |
| 6,397,306 B2 | * | 5/2002 | Ciavaglia et al. ........... | 711/148 |

* cited by examiner

*Primary Examiner*—T. Nguyen

(57) ABSTRACT

A method and system providing dynamic allocation of memory through hardware is disclosed. An embodiment provides for a multi-processor system providing for a secure partitioned memory. The system comprises a processor(s), a hardware implemented memory router coupled to the processor(s), and memory coupled to the memory router. The memory router stores memory partition information, which describes the memory allocated to the processor(s). Furthermore, the memory router maps a memory access request from a processor to an address in the memory.

20 Claims, 7 Drawing Sheets

| 700a | $M_1$ | $M_2$ | $M_3$ | $M_4$ | $M_5$ | $M_6$ |
|---|---|---|---|---|---|---|
| $P_1$ | R/W | R/W | | | | |
| $P_2$ | | | R/W | R/W | | |
| $P_3$ | | | | | R/W | R/W |

Fig. 2

| | $M_1$ | $M_2$ | $M_3$ | $M_4$ | $M_5$ | $M_6$ |
|---|---|---|---|---|---|---|
| $P_1$ | R/W | R/W | R/W | R/W | R/W | |
| $P_2$ | R/W | R/W | R/W | R/W | R/W | |
| $P_3$ | | | | | R | R/W |

|  | $M_4$ | $M_5$ |
|---|---|---|
| $P_4$ | R/W |  |
| $P_5$ |  | R/W |

Fig. 5

METHOD AND SYSTEM FOR CREATING SECURE ADDRESS SPACE USING HARDWARE MEMORY ROUTER

TECHNICAL FIELD

The present invention relates to the field of computer memory management. Specifically, the present invention relates to a hardware block capable of routing memory requests from multiple processors to multiple memories to create a secure address space.

BACKGROUND ART

In a modern multiprocessor shared memory system, processors are allocated a portion of the global shared memory by a common operating system (OS). With increasing numbers of processors, sometimes more than one operating system must be run at the same time within one system. In this case, the processors and memory controlled by each operating system must be independent. While separating processors is relatively easy, separating memory is much harder.

Two conventional methods of organizing memory within a microprocessor are private memory and shared memory. In a private memory system, a block of memory is accessible only to the processor that owns it. In contrast, in a shared memory, all or at least multiple processors have access to each memory location. When using a private memory, a fixed memory size is allocated to each processor. Therefore, when a processor is allocated to a task, the memory is allocated with it. However, providing such ownership of memory requires complex protection schemes and a global operating system, which may have multiple virtual operating systems running underneath it to provide the memory protection scheme. This means the security across the multiple operating system images is provided by software. Another method for providing memory protection is protection domains. However, protection domains require a global management layer, which is undesirable.

Some conventional solutions of multiplexing operating systems on the same hardware employ software or a combination of hardware and software. Software implemented methods present security problems. Conventional hardware implemented solutions may require a global operating system, which is undesirable.

Accordingly, the present invention provides a method and a system providing for dynamic allocation of memory through hardware. Further, the present invention provides a method which enforces security between multiple operating systems without the need for a central software authority. Further, the present invention provides for such a system which adds minimal hardware. Still further, the present invention provides such a system which permits but does not require shared memory and does not require complex protection schemes for private memory.

These and other advantages of the present invention will become apparent within discussions of the present invention herein.

DISCLOSURE OF THE INVENTION

A method and system providing dynamic allocation of memory through hardware is disclosed. An embodiment provides for a multi-processor system providing for a secure partitioned memory. The system comprises a plurality of processors, a hardware implemented memory router coupled to the processors, and memory coupled to the memory router. The memory router stores memory partition information, which describes the memory allocated to each of the plurality of processors. Furthermore, the memory router maps a memory access request from a processor to an address in the memory.

Another embodiment provides for a method of partitioning memory. The method recites the steps of a hardware implemented memory router receiving a request for memory access from one of a plurality of processors. This embodiment then recites the hardware memory router determining the location in memory corresponding to the address specified in the request, wherein the memory is partitioned among the plurality of processors. Next, this embodiment recites the hardware memory router routing the memory request to the memory, wherein the memory access is securely executed such that the processors are only able to access memory they are allocated.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 2 is a routing table showing the partitioning of processor and memory usage, according to an embodiment of the present invention.

FIG. 3 is a routing table showing the partitioning of processor and memory usage, according to an embodiment of the present invention.

FIG. 5 is a routing table for the configuration of FIG. 4, according to an embodiment of the present invention.

BEST MODE FOR CARRYING OUT THE INVENTION

In the following detailed description of the present invention, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have not been described in detail as not to unnecessarily obscure aspects of the present invention.

Figure 1:
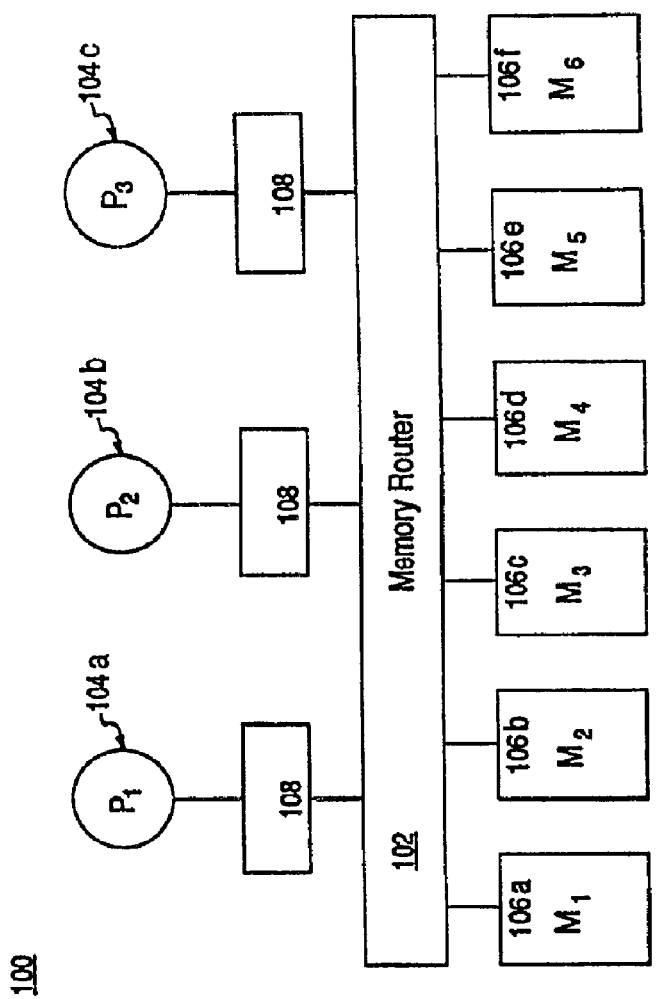
FIG. 1 is a block diagram of a multiprocessor with a memory router, according to an embodiment of the present invention.

FIG. 1 illustrates an embodiment of the present invention comprising a system 100 with a hardware block 102 (e.g., memory router) that is capable of routing memory requests 108 from multiple processors 104 to multiple memories 106 while maintaining strict separation/partition(s) between memory-processor pairs. It will be understood that the memories 106 are separated logically and may be part of the same physical construct (e.g., array). Furthermore, the present invention is not limited to a multi-processor environment, as embodiments are well suited to a single processor system.

Figure 7:
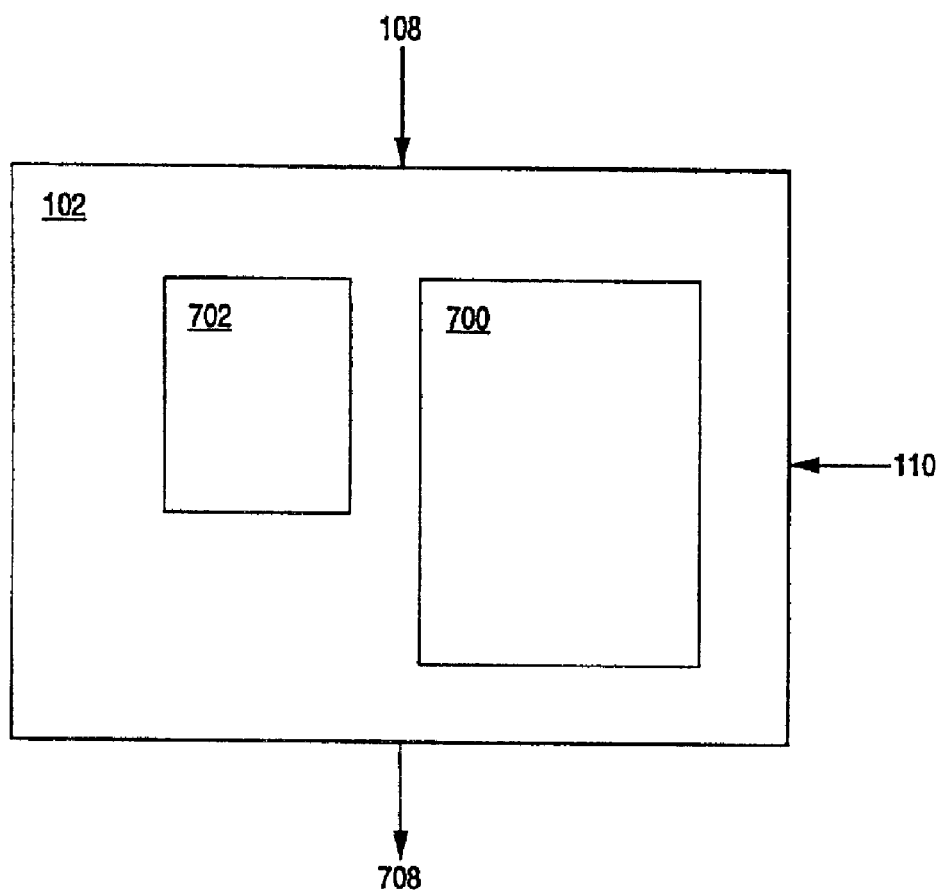
FIG. 7 is a block diagram of a hardware implemented memory router, according to an embodiment of the present invention.

Referring now to FIG. 7, at system boot-up time, the hardware implemented memory router 102 is loaded with a table 700 of memory partition information describing which processors 104 own which memories 106, and a translation from processor memory or processor address space (e.g., the memory address which the processor 104 uses to reference the data) to actual physical memory 106. Thus, the memory router 102 has logic 702 which allows it to map an input memory access request 108 from a processor 104 to an address 708 in the memory 106, which the router 102 may output. The router 102 also has an input 110 for configuring and re-configuring the router 102. The router 102 is also able to determine if memory access requests are valid.

Figure 2:
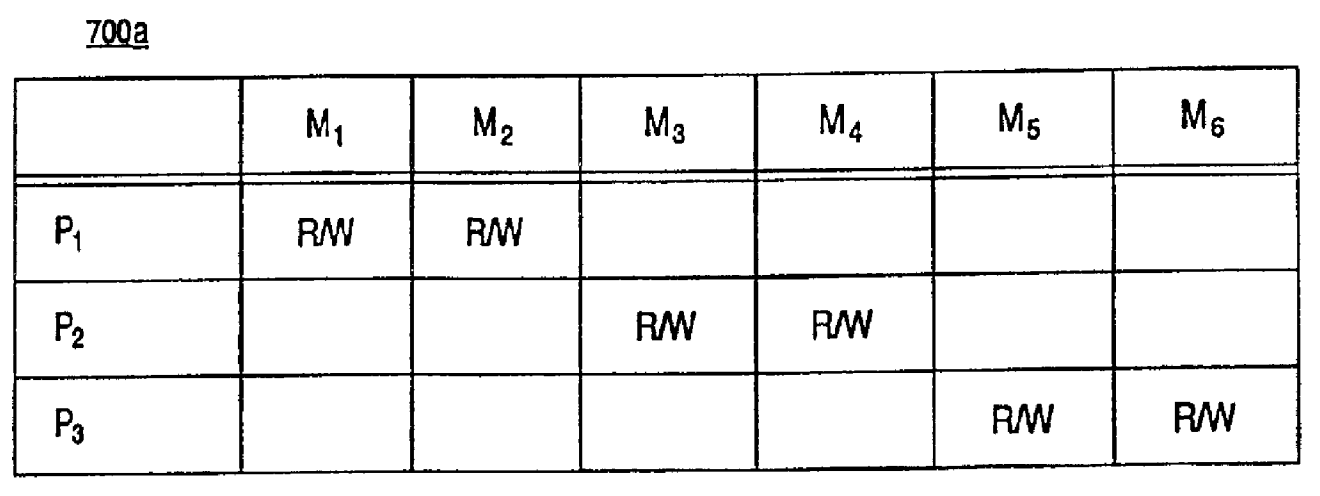

Referring now to FIG. 2, the table 700a shows a partitioning in which each processor 104 is aware of two blocks of memory 106, while unaware of the other four blocks of memory 106. With this configuration, each processor 104 is free to run totally independent operating systems, if desired. Processor $P_1$ 104a has read/write access to memories $M_1$ 106a, and memory $M_2$ 106b, etc. As the table 700a shows, this embodiment provides for a private memory configuration. Hence there is no need for complex control or a global operating/management system to oversee secure memory partitioning and access. Using a hardware implemented router 102 provides the advantages of partitioning the processors 104 and memory 106 as if they belong to one or more totally independent multiprocessors.

For example, processors $P_1$ 104a and $P_2$ 104b are totally independent because there is no way for them to interact. At system boot-up time, $P_1$ 104a only knows of two blocks of memory 106 that make up its processor address range from zero to sizeof($M_1+M_2$). $P_2$ 104b only knows of two blocks of memory 106 that make up its processor address range from zero to sizeof($M_3+M_4$). If $P_1$ 104a accesses memory location '1', then the memory router 102 routes the memory access request 108 to go to memory $M_1$ 106a. If $P_2$ 104b accesses memory location '1', then the memory router 102 routes the memory access request 108 to go to memory $M_3$ 106c. If $P_1$ 104a attempts to access memory location sizeof($M_1+M_2+1$), then the operating system running on processor $P_1$ 104a will trap on an invalid address range due to the attempt to access memory which does not exist. Thus, the hardware implemented memory router 102 enforces strict boundaries between the processors 104, and software running on the processors 104 is unable to change this.

The memory router 102 also allows for uneven distribution of memory blocks 106 and for some or all processors 104 to see some memory blocks 106 as read only. Write only access may be used also, if desired. The table 700b in FIG. 3 shows an example in which two processors 104 produce data while a third processor 104 is able to consume the data independently. In this case, processor $P_3$ 104c has read only access to memory block $M_5$ 106e, which is accessible by the other processors 104 in read/write mode. Thus, the memory partition information describes the type of access each processor 104 has to each portion of its allocated memory 106, wherein the type of access consists of read only, write only, and read/write access.

Embodiments of the present invention allow the hardware implemented router table 102 to be modified or re-configured without re-booting the multiprocessor (e.g., dynamic re-allocation of memory partitions, as well as the type of access a processor 104 has to a portion of memory 106). The router 102 may be re-configured rapidly, as described herein. However, if the memory 106 is currently owned by an operating system, the operating system must free all physical memory pages using the memory 106 that is going to be removed from that operating system's control. If memory 106 is to be added to a processor 104, the operating system running on the processor (or multiple processors) must be made aware of the new memory 106, which is a relatively simple task. In order to remove a block of memory 106, a conventional method may be used, such as, for example, a process in the operating system may search the page directory table (PDIR) to identify physical pages belonging to the memory block 106 being removed. After finding the pages, they may either be placed in the operating system's swap space or moved to memory block 106 that is still owned by a processor 104 running the operating system.

Figure 4:
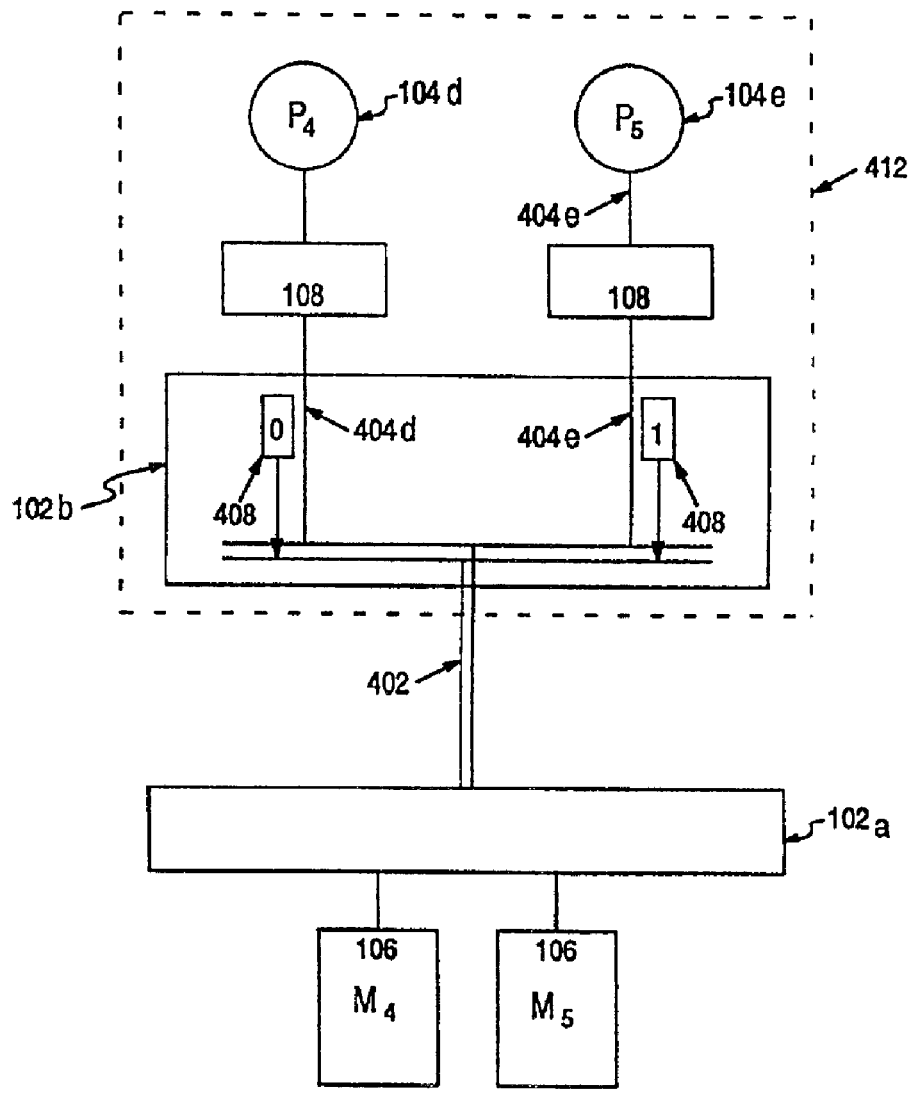
FIG. 4 is a block diagram showing multiple processors sharing a common bus with a two component memory router, according to an embodiment of the present invention.
Figure 5:
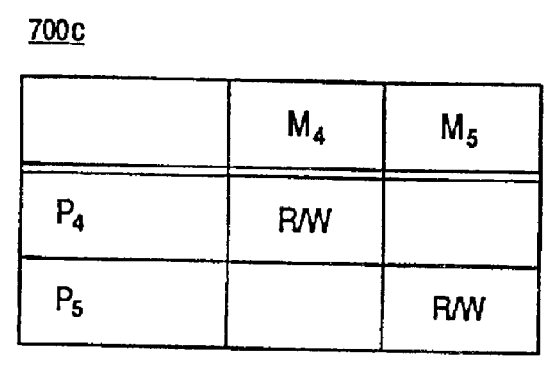

A further advantage of the present invention is that one or more separate processor/memory blocks may share one memory bus without fear that a processor 104 can write a memory 106 that it does not own, in one embodiment. Referring now to FIG. 4, the memory router 102 is broken into two components, which are separated by a communication link 402 such as a single bus, off-chip connection, network, etc. The processors 104 and the first component 102b may be on a separate chip 412 from the rest of the second component 102a of the memory router 102. A memory access request 108 sent by a processor 104 is tagged with additional information by the first component 102b of the memory router 102. The second component 102a of the memory router 102 uses that information to correctly route the memory access request 108 after it has passed over the communication link 402 between the two components of the memory router 102. In the embodiment of FIG. 4, a key 408 is transmitted on the bus alongside the memory access request 108 at substantially the same time the memory access request 108 is transmitted. The use of a key 408 is equivalent to using a longer physical memory address without the software running on the processor 104 being aware of it. Thus, the multiple processors 104 use the same communication link 402 and may use overlapping addresses while access to the memory 106 remains secure. By overlapping addresses it is meant that the processors 104 may transmit addresses that are identical, the key 408 being used to differentiate them. In FIG. 4, the key 408 consists of a single bit, zero indicating processor $P_4$ 104d sent the memory access request 108 and one indicating the other processor 104e sent it. FIG. 5 illustrates a table 700c for the configuration of FIG. 4 in which each processor 104 is allocated its own memory 106. Other configurations are possible. In this case, the memory router 102 uses the key 408 to identify which processor 104 sent the memory request 108 and to route the request appropriately. The present invention is well suited to using many more processors 104 sharing the communication link 402, by using more bits in the key 408. Because the key 408 is supplied by hardware as part of the communication link 402, there is no way for software executing on the processor to affect the key 408.

The memory partition information in the table 700 in the hardware memory router 102 may be re-configured such that the memory 106 may be dynamically allocated and the type of access which a processor 104 has may be altered. The reconfiguration may be performed by any suitable method, including software, firmware, and hardware. For example, when updating firmware, a software program which knows the access methods required to alter the memory router 102 configuration may be executed. Such a technique is used to update Flash ROMs installed in hardware, as is understood by those of ordinary skill in the art. The Flash ROM can normally only be read by the hardware, but can be written by a predetermined series of reads and writes.

Because of security risks which arise when software make updates, a preferred method is to change the hardware configuration via a port 110 to the memory router 102. The port 110 allows an outside source to change the memory router 102 configuration. By making this the only method of updating the memory router 102, software running on the processors 104 is not able to modify the memory router 102 because access to the physical computer is required to update the router 102. Hence, software running on one partition of the memory 106 is not able to unpermittedly affect software running on another partition.

One embodiment of the present invention provides for a read-only data vault. One or more memory blocks 106 may be written with important or sensitive data that is required for operation of the software, but is updated on an infrequent basis. An example of this is a data base that is accessed by customers and updated by a back-end database once every day, for example, at 3:00 a.m. Some portion of the data may be required to always be in memory 106 for efficiency, but any changes to the data between the updates would have severe consequences. To guard against any software making changes, the special port 110 can be used to periodically modify the memory router 102 in such a fashion to provide read/write access to a selected processor 104 at a specified time, for example, between 3:00 a.m. and 3:01 a.m. The modifications to the memory router configuration can be automated by a computer which is separate from the multiprocessor and which has no outside connection. At other times, the memory router 102 is configured such that the secure block of memory 106 is read-only. This provides a foolproof method to block incursions by hackers that do not have physical access to the multiprocessor.

Figure 6:
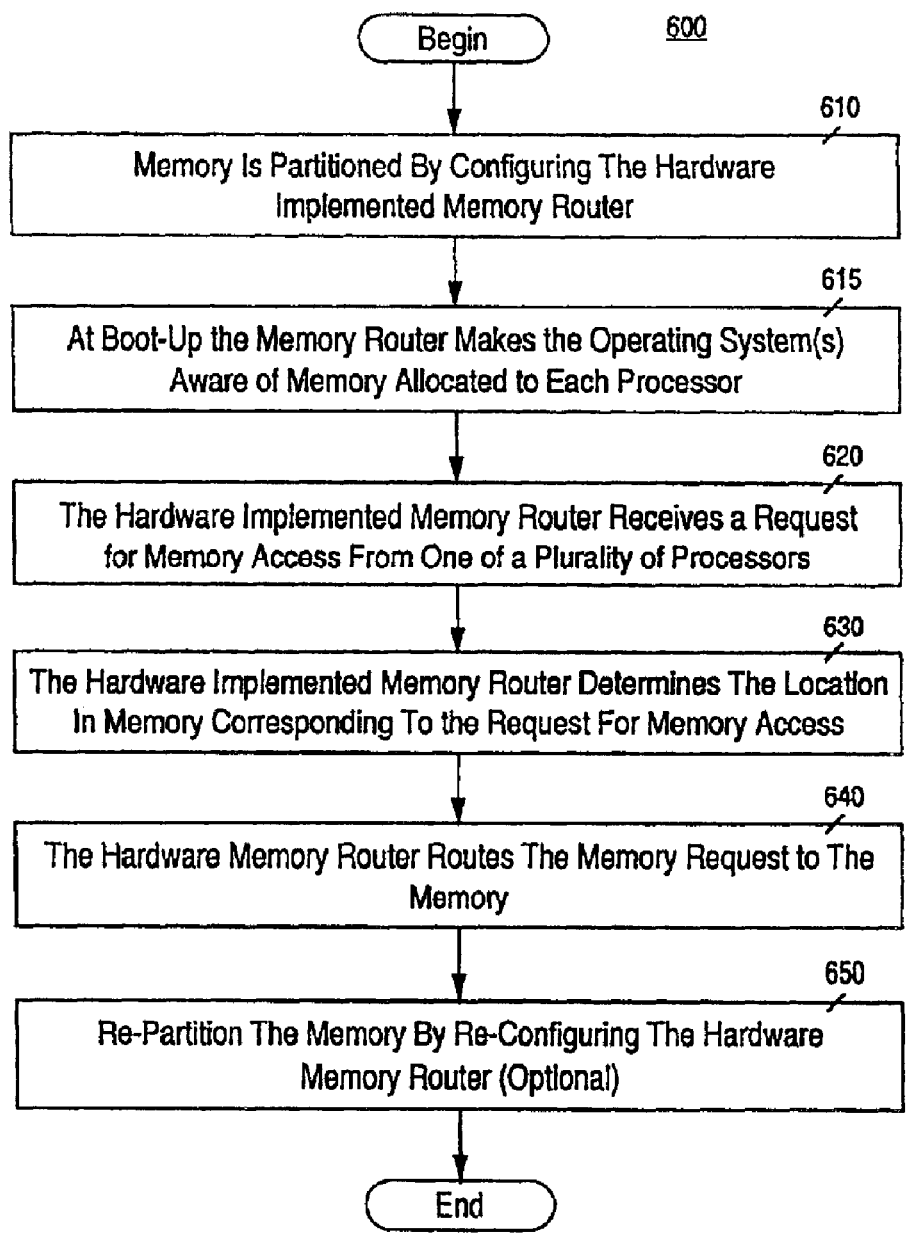
FIG. 6 is a flowchart of the steps of a process of partitioning memory, according to an embodiment of the present invention.

Referring now to FIG. 6, an embodiment of the present invention provides for a process 600 of dynamically allocating memory 106 through hardware. In step 610, the memory 106 is partitioned by configuring the hardware implemented memory router 102.

In step 615, the memory router makes the operating systems aware of what memory has been allocated to each processor 104.

In step 620, the memory router 102 receives a request for memory access 108 from one processor 104 of a number of processors 104. The request specifies an address by which the processor 104 knows the data. For example, each processor 104 may have an address space that may run from zero to the size of its allocated memory, although other ranges are possible.

In step 630, the memory router 102 determines the location in physical memory 106 corresponding to the request for memory access 108.

Next, in step 640, the memory router 102 routes the request to the memory 106. Steps 620 through 640 are repeated as more processor 104 memory requests 108 are made.

Optionally, the memory router 102 may be re-configured, which effectively re-partitions the memory 106, in step 650. Furthermore, the type of access a processor 104 has to each memory block 106 may be altered. For example, a processor 104 may have read only, write only, or read and write access to selected portions of memory 106.

The preferred embodiment of the present invention, a method and a system providing for dynamic allocation of memory through hardware, is thus described. While the present invention has been described in particular embodiments, it should be appreciated that the present invention should not be construed as limited by such embodiments, but rather construed according to the below claims.

What is claimed is:

1. A system having a partitioned memory, said system comprising:
   a plurality of processors;
   a hardware implemented memory router coupled to said processors; and
   memory coupled to said memory router;
   wherein said memory router is configured to store memory partition information describing the memory allocated to each of said plurality of processors; and
   wherein said memory router is further operable to map memory access requests from said plurality of processors to respective addresses in said memory allocated to each of said plurality of processors.

2. The system of claim 1, wherein:
   said memory partition information further describes the type of access each processor of said plurality has to each portion of its allocated memory; and
   said memory router is further operable to determine whether a memory access request having a first address from a first processor of said plurality is valid for said first address, based on the type of access and said first address.

3. The system of claim 2, wherein said type of access is selected from the group consisting of read only, write only, and read/write access.

4. The system of claim 1, wherein said router is re-configurable by altering said memory partition information, wherein said memory allocated to said plurality of processors is re-allocable.

5. The system of claim 1, wherein said router is re-configurable by altering said memory partition information, wherein said type of access allocated to at least one processor of said plurality of processors is modifiable.

6. The system of claim 1, wherein said memory router comprises a first component and a second component, said first and said second components coupled by a communication link;
   said first component operable to add a key to said memory access request, said key identifying said second processor; and
   said second component operable to use said key to route said request to said address in said memory allocated to said second processor, wherein multiple processors using the same communication link and using overlapping addresses securely access said memory.

7. The system of claim 1, wherein said memory partition information is stored in a table containing a translation from processor address space to memory.

8. The system of claim 7, wherein said table further comprises information allocating to a first processor of said plurality read only access to a first memory partition and to a second processor read and write access to said first memory partition.

9. The system of claim 1, wherein more than one processor has access to a memory partition, wherein said memory is shared and said memory router has control over memory access.

10. The system of claim 1, wherein said plurality of processors are coupled to said memory router via a single communication link.

11. The system of claim 1, wherein said plurality of processors are coupled to said memory router via a plurality of communication links.

12. The system of claim 1, wherein a first processor of said plurality runs a first operating system and said second processor of said plurality runs a second operating system and wherein said second processor is allowed to read the memory allocated to said first processor but is not allowed to write to said memory allocated to said first processor.

13. A method of partitioning memory, said method comprising the steps of:
a hardware implemented memory router receiving a request for memory access from one of a plurality of processors, said request specifying a first address;
said hardware memory router determining the location in memory corresponding to said first address, said memory partitioned among said plurality of processors;
said hardware memory router routing said memory request to said memory, wherein said memory access is securely executed such that said one of said plurality of processors is only able to access memory which is allocated to it; and
re-partitioning said memory by re-configuring said hardware memory router with commands entered via an external port to said memory router, wherein software executing on said plurality of processors is unable to modify said memory router.

14. A method of partitioning memory as recited in claim 13 further comprising:
changing the type of access that said one processor of said plurality has to a portion of said memory by re-configuring said memory router.

15. A method of partitioning memory as recited in claim 14 wherein said type of access is selected from the group consisting of read only, write only, and read/write access.

16. A method of partitioning memory as recited in claim 14 wherein said re-partitioning further comprises:
periodically re-configuring said memory router.

17. A method or partitioning memory as recited in claim 13 further comprising the steps of:
adding information to said memory request, said information specifying the processor or said plurality of processors which made said memory request, said plurality or processors sharing a communication link; and
after receiving said memory request via said communication link, said memory router using said information to determine which processor made said memory request.

18. A hardware implemented memory router comprising:
an input to receive a memory access request, said request specifying an address in a first processor's of a plurality of processors address space;
a table for storing memory partition information, said information describing the memory allocated to each of said plurality of processors;
logic operable to translate said address in said processor address space to a corresponding address in said memory; and
a first component and a second component, said first and said second components coupled by a communication link, wherein said first component is operable to add a key to said address specified by said processor request, said key identifying the processor of said plurality making said request; and wherein said second component is operable to use said key to route said request to the appropriate memory address, wherein multiple processors using the same communication link and using overlapping processor addresses securely access said memory.

19. The hardware implemented memory router of claim 18, wherein:
said memory partition Information further describes the type of access each processor of said plurality has to each portion of its allocated memory; and
said memory router is further operable to determine whether said memory request from said first processor is valid for said address specified in said request, based on the type of access and said address specified in said request.

20. The memory router of claim 18, further comprising an external port to said memory router, wherein commands entered via said external port are operable to re-configure said memory router to re-partition memory allocation to said plurality of processors.

* * * * *